Figure 3:
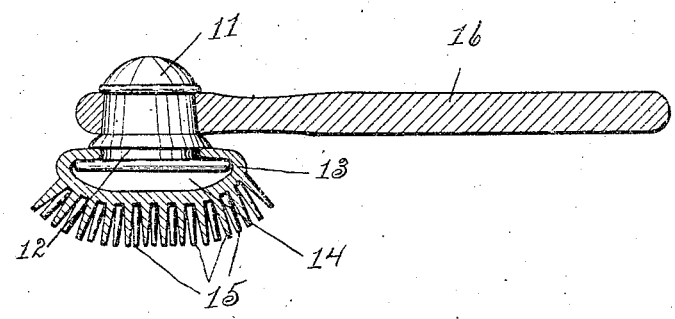

C. E. THOMPSON.
MASSAGE DEVICE.
APPLICATION FILED JULY 30, 1910.

1,058,273.

Patented Apr. 8, 1913.

WITNESSES:
J. E. Donsbach.
Rose W. Leduc.

INVENTOR
Charles E. Thompson
BY
Frank C. Curtis
ATTORNEY

UNITED STATES PATENT OFFICE.

CHARLES E. THOMPSON, OF TROY, NEW YORK, ASSIGNOR TO LUXURY SALES COMPANY, OF TROY, NEW YORK, A CORPORATION OF NEW YORK.

MASSAGE DEVICE.

1,058,273.  Specification of Letters Patent.  Patented Apr. 8, 1913.

Application filed July 30, 1910. Serial No. 574,669.

*To all whom it may concern:*

Be it known that I, CHARLES E. THOMPSON, a citizen of the United States, residing at Troy, county of Rensselaer, and State of New York, have invented certain new and useful Improvements in Massage Devices, of which the following is a specification.

The invention relates to such improvements and consists of the novel construction and combination of parts hereinafter described and subsequently claimed.

Reference may be had to the accompanying drawings, and the reference characters marked thereon, which form a part of this specification. Similar characters refer to similar parts in the several figures therein.

Figure 1:
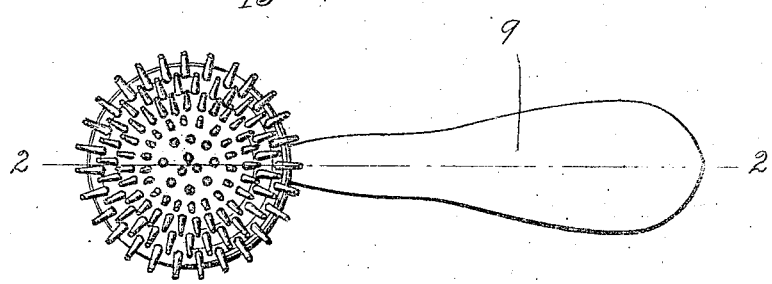
Figure 2:
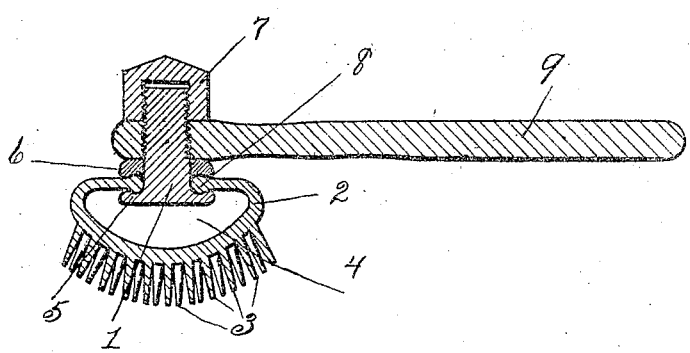

Figure 1 of the drawings is a plan view of my improved massage-device. Fig. 2 is a central, vertical, longitudinal section of the same taken on the broken line 2—2 in Fig. 1. Fig. 3 is a similar sectional view showing another form of my invention.

The principal object of the invention is to provide a massage-device which can be used without danger of injuriously or painfully irritating a tender skin.

Referring to Figs. 1 and 2 of the drawings wherein the invention is shown in preferred form, 1, represents a support upon which is mounted a rubber head, 2, studded with rubber fingers, 3, formed integral with said head. The head is made hollow whereby it is provided with a free interior airspace, 4, and it is mounted upon the support, 1, preferably in such a manner that the air-space, 4, is hermetically sealed.

In Fig. 2 I have shown the support, 1, formed with an enlarged head, 5, adapted to be forced within the rubber head, 2, through an aperture formed therein, after which the edges 8 of the rubber adjacent to said aperture are tightly clamped between the enlarged end, 5, of said support and a washer, 6, by means of a nut, 7, fitting the screw-threaded outer end of said support 1. The rubber fingers, 3, are shown extending divergently outward from the head, 2, and each finger is shown tapered from its base to its apex. The fingers, 3, are shown molded integral with the rubber head 2.

The device may be provided with a handle in any known manner. I have shown a handle, 9, projecting laterally from the support, 1, to which it is attached by clamping it between the washer, 6, and the nut, 7, the handle being provided with an aperture through which the screw-threaded support, 1, passes. The rubber head, 2, being hollow, and having the sealed free interior air-space, 4, forms a pneumatic pad which is free to yield to pressure at any point upon its surface, and this with the tapered form of rubber fingers adapts the device to conform with the irregularities in the surfaces of the body under treatment, and to exert thereupon a substantially uniform and gentle pressure as the device is moved over said surfaces. The rubber fingers, 3, are shown of a length equal to several times their diameter. The rubber head, 2, and fingers, 3, are so vulcanized as to leave them comparatively soft and highly elastic. The convexed or rounded form of the head, 2, as shown not only facilitates the divergent arrangement of the fingers, 3, but adapts the device for better contact and engagement with the irregularities of the surface under treatment.

In Fig. 3 I have shown a support, 11, formed with a peripheral groove, 12, upon which support is mounted a hollow rubber head, 13, provided with a free interior airspace, 14, and having tapered rubber fingers, 15, projecting divergently from its surface. The rubber head, 13, is provided with an aperture through which the inner end of the support, 11, can be inserted, due to the elasticity of the rubber; and the edges of the rubber head bordering said aperture are adapted to be seated in the groove, 12, thereby retaining the head upon the support 11.

This device is also shown provided with a laterally projecting handle, 16, which may be attached thereto in any known manner.

For certain purposes of the invention the working face of the rubber head may be roughened in any known manner instead of by means of fingers as shown.

What I claim as new and desire to secure by Letters Patent is—

1. In a massage device, and in combination, a suitable support; and a convexed elastic rubber head having rubber fingers projecting therefrom, said fingers being elastic and long as compared with their diameter, said rubber head being removably mounted upon said support with an air-space in said head opposite said convexed portion.

2. In a massage device, and in combination, a suitable support; a convexed elastic rubber head having rubber fingers projecting divergently therefrom, said fingers tapering toward their outer ends, and being elastic and long as compared with their diameter, said rubber head being removably mounted upon said support with an air-space between said head and said support; and a handle projecting from said support at right angles to the axis of said head.

3. In a massage-device, and in combination, a hollow rubber head provided with an interior air-space; rubber fingers projecting from said head; a support having an enlarged end adapted to be forced through an aperture in said rubber head to interiorly engage the edge of the rubber head surrounding said aperture; a washer adapted to exteriorly engage said rubber head surrounding said aperture; and screw-mechanism for tightly clamping the engaged portion of the rubber head between said washer and the enlarged end of said support.

In testimony whereof, I have hereunto set my hand this 26th day of July, 1910.

CHARLES E. THOMPSON.

Witnesses:
FRANK C. CURTIS,
J. E. DONSBACH.